United States Patent [19]
Indeck et al.

[11] Patent Number: 5,625,689
[45] Date of Patent: Apr. 29, 1997

[54] METHOD AND APPARATUS FOR SECURE DATA STORAGE AND MANIPULATION USING MAGNETIC MEDIA

[75] Inventors: Ronald S. Indeck, Olivette; Marcel W. Muller, St. Louis, both of Mo.

[73] Assignee: Washington University, St. Louis, Mo.

[21] Appl. No.: 417,666

[22] Filed: Apr. 5, 1995

Related U.S. Application Data

[63] Continuation-in-part of Ser. No. 208,997, Mar. 10, 1994, and Ser. No. 222,693, Apr. 19, 1994, Pat. No. 5,428,683, which is a continuation-in-part of Ser. No. 46,071, Apr. 9, 1993, Pat. No. 5,365,586.

[51] Int. Cl.$^6$ ............................................. H04K 1/00
[52] U.S. Cl. ............................................. 380/3; 380/23
[58] Field of Search ............................. 380/3, 4, 23, 25, 380/49

[56] References Cited

U.S. PATENT DOCUMENTS

| | | | |
|---|---|---|---|
| 4,038,596 | 7/1977 | Lee | 324/34 R |
| 4,806,740 | 2/1989 | Gold et al. | 235/449 |
| 4,985,614 | 1/1991 | Pease et al. | 235/440 |
| 5,365,586 | 11/1994 | Indeck et al. | 380/3 |
| 5,408,505 | 4/1995 | Indeck et al. | 380/4 |
| 5,428,683 | 6/1995 | Indeck et al. | 380/4 |
| 5,546,462 | 8/1996 | Indeck et al. | 380/23 |

*Primary Examiner*—David C. Cain
*Attorney, Agent, or Firm*—Howell & Haferkamp, L.C.

[57] ABSTRACT

Data recorded on a magnetic medium may be securely identified and manipulated for use in credit balance applications by determining a magnetic fingerprint benchmark on the medium as well as a distance between this benchmark and any pre-selected magnetic feature such as a magnetic transition of a data bit of the data set. Verification of the data may be achieved by measuring this distance and comparing it with the distance recorded at the time that the data was originally placed on the medium. As there is a detectable difference in accuracy between reading this distance as contrasted with illegitimate attempts to write false data at a pre-selected distance from the benchmark, attempts at forgery are detectable.

22 Claims, 1 Drawing Sheet

METHOD AND APPARATUS FOR SECURE DATA STORAGE AND MANIPULATION USING MAGNETIC MEDIA

CROSS REFERENCE TO RELATED APPLICATIONS

This application is a continuation-in-part of Ser. No. 08/222,693 filed Apr. 4, 1994, now U.S. Pat. No. 5,428,683 which is a continuation-in-part of Ser. No. 08/046,071 filed Apr. 9, 1993, now U.S. Pat. No. 5,365,586; and a continuation-in-part of Ser. No. 08/208,997 filed Mar. 10, 1994, the disclosures of which are incorporated herein by reference.

BACKGROUND AND SUMMARY OF THE INVENTION

The sources of noise in a read back signal from a magnetic recording medium have been investigated and identified. One of those sources includes the irregularities and defects in the microstructure of the magnetic medium itself. For many years, the noise generated from this source has been thought, as with the noise generated from other identified sources, to be random and subject only to statistical analysis for its determination. The inventors herein have recently demonstrated that this noise component is instead deterministic, i.e. is permanent and repeatable, depending entirely on the transducer-medium position and on the magnetic history of the medium. As confirmed by experiments conducted by the inventors herein, when the medium has had no signal written on it and has been recorded only with DC fields, the observed read back signals are almost identical. The magnetic contribution to the read back signal under these conditions results from spatial variations in the medium's magnetization: magnetic domains, ripple, local fluctuations of the anisotropy field and saturization magnetization. These local properties, in turn, are affected by the morphology and magnetic properties of the individual grains which make up the domain and which do not change after deposition. Hence, the noise from a nominally uniformly magnetized region measured at a fixed position on a magnetic medium is reproducible. As shown by the inventors herein, a magnetic medium may be DC saturated and its output then measured to determine its remanent state or remanent noise. The inventors have confirmed that this remanent noise is a function of the magnetic microstructure by comparing the remanent noise after a positive DC saturation with the remanent noise after a negative DC saturation. It has been found that these wave forms are virtual "mirror images" of each other thereby demonstrating a close correlation. Similarly, other methodologies were used to confirm that the remanent noise was determinative, repeatable, and related to the physical microstructure of the magnetic medium itself. Remanent noise arising from the permanent microstructure exhibits identifiable features characteristic of that permanent microstructure after practically any magnetic history. See *Spatial Noise Phenomena of Longitudinal Magnetic Recording Media* by Hoinville, Indeck and Muller, *IEEE Transactions on Magnetics*, Volume 28, No. 6, November 1992, the disclosure of which is incorporated herein by reference.

The inventive technique disclosed and claimed herein relies upon the discovery that the microscopic structure of the magnetic medium itself is a permanent random arrangement of microfeatures and therefore deterministic. In other words, once fabricated, the recording medium's physical microstructure remains fixed for all conventional recording processes. In particulate media, the position and orientation of each particle does not change within the binder for any application of magnetic field; in thin film media, the microcrystalline orientations and grain boundaries of the film remain stationary during the record and reproduce processes. It is the magnetization within each of these fixed microfeatures that can be rotated or modified which forms the basis of the magnetic recording process. If a region of a magnetic medium is saturated in one direction by a large applied field, the remanent magnetization depends strongly on the micro-structure of the medium. This remanent state is deterministic for any point on the recording surface. Each particle or grain in the medium is hundreds to thousands of Angstroms in dimension. Due to their small size, a small region of the magnetic surface will contain a very large number of these physical entities. While the fabrication process normally includes efforts to align these particles, there is always some dispersion of individual orientations. The actual deviations will be unique to a region of the medium's surface making this orientation deterministic and making its effects susceptible to elimination. As can be appreciated by those of ordinary skill in the art, this "magnetic fingerprint" is an important development and the inventors herein have succeeded in implementing its use in a number of inventions.

There is a long felt need in the art for a portable magnetic data storage device, such as a magnetic credit card, which contains data associated with a credit or debit balance (and which might be associated with an account in the user's name), and a method for securely maintaining the stored value and also manipulating the data in response to transactions engaged in by the holder. While magnetic recording is robust, offers erasability and rewritability, and is usually inexpensive compared to other data storage solutions, these "user friendly" features render magnetic recording susceptible to fraud. Nevertheless, magnetic data storage is ubiquitous in that credit cards, entry cards, decrement cards, bank checks, telephone cards, mass transit cards, etc. all use magnetic storage media. Generally, however, the magnetic storage application for these media do not involve storing a credit balance, for example, which may then be decremented as the user makes purchases until the account balance reaches zero or near zero because of the risk of fraud. One particular kind of fraud stemming from the rewritability of magnetic media is that of "buffering". This form of fraud involves copying and storing the data from a legitimate source (such as a decrement card) and restoring this original data back to the source after the source has been used for purchases. In many pre-pay systems (for example mass transit tickets or vending cards) the point of sale processing includes manipulation of the data on the card to reflect the amount used. For example, a $5.00 balance may be decremented to $4.00 after a mass transit ticket has been used for a single fare. In this form of fraud, a user may utilize the magnetic storage card to legitimately decrement the account balance from $5.00 to $4.00, and then illegitimately reprocess the card by restoring to the card its original data which returns the account balance to $5.00. In this scheme, a user would read the data from the magnetic stripe or other form of magnetic medium utilized in the card into a "buffer" and then dump the data from the "buffer" back to the magnetic data stripe after the card has been used. While others are presently working on systems utilizing computer chips or other more elaborate and sophisticated data storage techniques for creating portable data storage cards and the like, the inventors are not aware of any prior art systems which have been successful in eliminating the various kinds of fraud which can be practiced on less expensive magnetic recording media such as the magnetic data stripe typically found on credit cards and the like.

In order to solve these and other problems in the prior art, the inventors herein have succeeded in utilizing their discoveries of the "magnetic fingerprint" in developing both a card and a methodology which defeats the "buffering" fraud and which otherwise permits a simple magnetic data storage medium such as a magnetic data stripe to be used to securely store a credit balance and provide for the secure manipulation of that balance for restorage back on the data stripe. It is known in the art that the accuracy with which data may be written into a magnetic medium is not nearly as good as that accuracy with which data may be read from a magnetic medium. In other words, once data is written into a magnetic stripe, the distance between data bits or between any single data bit and a benchmark, index, or other marker such as a magnetic fingerprint, may be measured to a much greater degree of accuracy than the accuracy with which data may be placed on the magnetic data stripe. By way of further example, it may be very accurately measured that a particular data bit is x distance away from a benchmark. However, the task of placing a desired data bit that same x distance from a benchmark may not be readily achieved with the same accuracy. This discrepancy in accuracy between reading and writing data from and onto a magnetic data storage medium provides the ability to discriminate between data originally written or rewritten using authorized rewriting techniques on the one hand, and fraudulently rewritten data on the other.

With the present invention, use is made of the magnetic fingerprint to provide a benchmark which may be very accurately located and which may be reliably, repetitively, used not only when data is originally recorded onto the magnetic medium, but also upon later reading and rewriting of data onto the magnetic medium. A second convenient marker needs to be identified and which is conveniently associated with the data actually written into the magnetic medium. For example, the first or closest data bit to the fingerprint may be used. Alternatively, a bit associated with the data but which is dedicated solely to this use and which has no other significance or importance may be utilized as well. A distance may then be determined very accurately between the magnetic fingerprint and the chosen data bit. This distance may be measured conveniently in units of length, or in other units of measure such as time, depending upon the particular process used to read and write data to the magnetic medium. Preferably, the inventors believe that the distance may be measured in units of length. Once this distance is determined, it (with or without the magnetic fingerprint) may be conveniently stored for later use during a comparison step. Most conveniently, this value may be stored directly in the magnetic medium so as to be readily accessible at the point at which the magnetic medium is used. These distance and magnetic fingerprint values may be encoded, or may be encrypted or otherwise disguised or hidden from detection in order to further minimize the chances of fraud using any of the well known techniques available in the prior art. In use, as the magnetic medium is read during a transaction, the reader locates the magnetic fingerprint, locates the designated magnetic feature (such as a magnetic transition) of a data bit, measures the distance, reads the distance value stored in the magnetic medium, and compares it with the measured distance value. If the measured distance value matches the stored distance value to an acceptable level of statistical significance, the data may then be assumed to be original or otherwise authentic data and the transaction further processed. This further processing would typically include reading the data from the magnetic medium, manipulating the data such as by decrementing it to reduce the account balance in consideration of the value of the transaction, and then restoring it on the magnetic medium. Additionally, another measurement is made between the magnetic fingerprint and the designated data bit to determine a new distance, and its value restored in the magnetic medium for subsequent transactional use, and the manipulated data is stored on the magnetic medium.

As explained above, the differences in accuracy between a read and write step provides the opportunity for utilizing this methodology. When data is rewritten into a magnetic medium, the position of the data with respect to the medium will virtually always be different from its original position. Differences as small as tenths of microns in distance between data bits may be readily detected. With the present methodology, the difference in distance may be readily determined by measuring the distance between the peak of the correlation function for the magnetic fingerprint and the peak of the selected data bit. Even with highly accurate, laboratory quality data writing equipment, the writing of data bits is effectively impossible to control to achieve an accuracy down to the level of tenths of microns. The apparatus and method of the present invention is believed to eliminate the "buffering" fraud which is one of if not the most significant obstacle to utilizing simple magnetic recording media in account balance types of applications.

As part of the overall system developed by the inventors herein, there is also included several alternative uses for portions thereof independently of the overall system. For example, by utilizing the techniques and features of the present invention, data may be recorded onto a magnetic medium and verified at any subsequent time by verifying its correct location a specified distance from a benchmark on the magnetic medium. This invention includes not only a magnetic medium having verifiable data recorded thereon, but also a method for placing data on the magnetic medium for later verification. There is also disclosed a method for later verifying data which has previously been recorded on a magnetic medium which may be separately used as part of an authentication process or procedure. Still another aspect of the invention includes the feature of storing the values necessary for verification directly on the magnetic medium, storing those same values off line but readily accessible so as to enhance the security of the overall system, or storing the values in either location in an encrypted, or otherwise disguised manner for still greater security. Still another aspect includes the methodology for reading, manipulating, and restoring data into a magnetic medium in a secure manner. These various aspects and features of the invention may be utilized separately and independently of the overall system and methodology which provides for avoidance of "buffering" fraud.

In perhaps its simplest implementation, the present invention may be used to adapt credit cards having a magnetic data storage stripe thereon for use with credit balance type applications. However, it should be understood that the present invention has applicability to any magnetic medium including cards, magnetic tape, etc. Additionally, any kind of data written into a magnetic medium may be verified such that its use does not depend upon credit balance applications. For example, identification cards which have encoded thereon a security code or password may be verified to prevent the encoding from being altered. In this example, a security or entry card which provides one level of access could not be conveniently altered to provide a greater level of access should the present invention be utilized to verify data recorded on the card. Thus, this methodology and invention provides even a greater level of security than simple use of the magnetic fingerprint as it may be used not only to verify that the card itself is an original and authentic card but also that the data recorded thereon is authentic. It should also be understood that any magnetic feature may be used, not only a magnetic transition, for measuring a distance to a fingerprint. There are still other applications in which the various aspects and features of the present invention may be utilized. Such other applications and features are to be broadly considered as covered herein.

While the principal advantages and features of the present invention have been described above, and a number of examples given, a greater understanding of the invention may be attained by referring to the drawings and the description of the preferred embodiment which follow.

DETAILED DESCRIPTION OF THE PREFERRED EMBODIMENT

Figure 1:
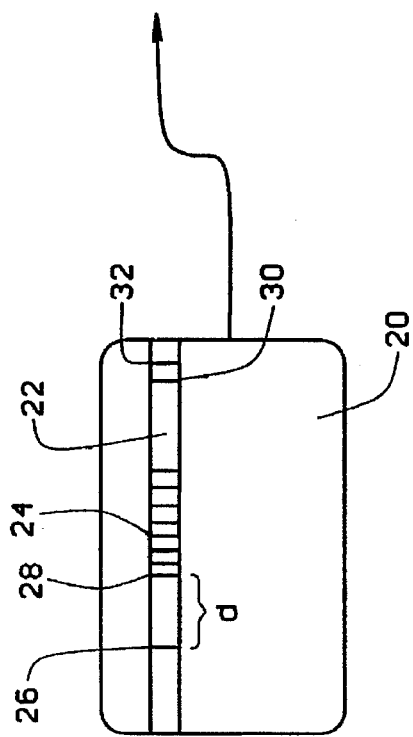
FIG. 1 depicts a typical credit card with a stripe of magnetic medium.

As shown in FIG. 1, a typical credit card 20 includes a stripe of magnetic medium 22 for the storage of data 24 as well as the location of a benchmark 26. The data 24 is written on the stripe of magnetic medium 22 in a typical manner as is well known in the art. As shown in FIG. 1, these data bits are shown representatively as lines of magnetization. The benchmark 26 is also shown representationally as a line but it should be understood that the benchmark 26 is only the location of a magnetic fingerprint. A full and complete discussion and description of a magnetic fingerprint is found in the inventors prior U.S. Pat. No. 5,365,586 issued Nov. 15, 1994, the disclosure of which is incorporated herein by reference. As disclosed therein, the magnetic fingerprint 26 merely represents a location which may be reliably and repetitively located to a great degree of accuracy by correlating the remanent noise characteristic for a short length, e.g., 30 to 50 microns, of magnetic medium. Through this methodology, a very precise positioning of a magnetic head with respect to the medium 22 may be achieved. For purposes of illustrating the present invention, a distance "d" has been indicated as the distance between benchmark 26 and the closest magnetic transition 28 of a data bit in data set 24. As will be further explained, the value of the benchmark 26 may be stored as data 30 and the value of d may be stored as data 32 directly on the stripe of magnetic medium 22 for use in the present invention.

Figure 2:
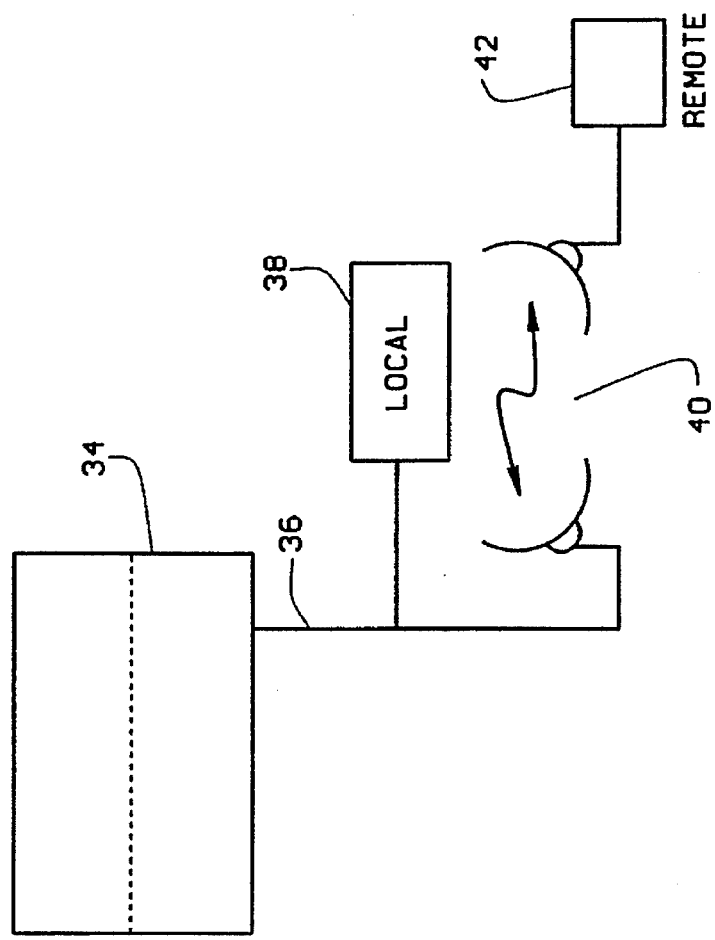
FIG. 2 depicts a credit card reader for reading the credit card of FIG. 1 and communicating with either or both of a local or remote credit card data processing and storage capability.

The use of the credit card 20 may now be explained with reference to FIG. 2. As credit card 20 is "swiped" through card reader/processor 34 (either manually or motor driven), the card reader/processor 34 may readily read the benchmark data 30, the "d" data 32, locate benchmark 24 by matching the benchmark data 30 with the direct measurement of benchmark 26, and measure the distance between benchmark 26 and the magnetic transition 28 of data 24. By comparing the stored value of d with the measured value of d, credit card reader/processor 34 may then verify or authenticate that the data 24 contained on credit card 20 is authentic. Credit card reader/processor 34 may then process the data through either decrementing the data set 24 such as in a credit balance card, or otherwise, depending upon the particular application. For this purpose, a data link 36 may be established with a local data memory and processing capability 38 or, with the aid of a remote data link 40, to a remote data memory and processing capability 42. With this local memory and processing 38, or remote memory and processing 42, the credit card reader/processor 34 has full capability to read and verify data 24, manipulate data 24 into a new data set representative of transactional activity or other desired changes, and rewrite a new data set onto the stripe of magnetic medium 22. During this rewriting or restoring of data set 24 or a new data set, the credit card reader/processor 34 redetermines by measuring the distance "d". This is because the accuracy with which data may be read from a magnetic medium is much greater than that which may be written onto a magnetic medium. After having re-determined the distance d, its value may then be restored or rewritten as data bit 32. In most processing, there is no need to redetermine and re-establish a benchmark 26 by redetermining a magnetic fingerprint for storage as data bit 30.

Various aspects of this invention may be utilized separately for different applications. For example, the transactional portion of the above described method of operation may be eliminated should it be desired merely to use the credit card 20 as an entry card. In such event, the data set 24 need merely be authenticated and may also be used to determine a level of access to a variety of secure areas or for other similar purposes. Also, benchmark and distance d data may be eliminated from credit card 20 and instead be stored off line in either or both of local data memory and processing 38 or remote data memory and processing 42. In still another alternative embodiment, the benchmark and distance data may be encrypted or otherwise manipulated for local storage on credit card 20. In either or both of these alternatives, an identifying account number or other i.d. number may be used to correlate the credit card 20 with its appropriate data file in local data memory 38 or remote data memory 42.

For purposes of illustration only, the present invention has been described in terms of a credit card 20 and credit card reader/processor 34. However, it should be understood that the particular magnetic medium utilized may be any of the available magnetic medium which is capable of having determined therefor a magnetic fingerprint as is more fully explained in the parent applications and patent referenced above. However, the present invention does have a ready application for use with credit cards which are ubiquitous in present day society.

The inventors also note that the steps in the methods described herein are not necessarily performed in lock step order. The order of implementation of these steps depends to some extent upon the particular embodiment utilized, the particular application, and the desires of the user. The order that the data is read from credit card 20 may also be used to determine the ordering of the steps performed in the several methods of the present invention. In some applications, credit card 20 may be "captured" and held by credit card reader/processor 34 such that the entirety of data recorded on the stripe of magnetic medium 22 may be readily accessible in any order.

It should further be noted that the distance d between benchmark 26 and the first magnetic transition 28 of data 24 may be determined not only in terms of unit length but also with respect to time. For example, should the credit card reader/processor 34 be motor driven such that a controlled rate of speed be used to advance credit card 20 therethrough, the lapsed time between reading data bit 28 and benchmark 26 may also represent a measure of length which may perhaps be accurate enough to discriminate authentic data from forged data. Techniques and processes as would be well known to those of ordinary skill in the art may be used to good advantage to determine the alternative ways of measuring the distance d in order to achieve the purposes of the present invention.

There are various changes and modifications which may be made to the invention as would be apparent to those skilled in the art. However, these changes or modifications are included in the teaching of the disclosure, and it is intended that the invention be limited only by the scope of the claims appended hereto.

What is claimed is:

1. A method for recording verifiable data on a magnetic medium, said method comprising the steps of:

writing data onto a magnetic medium, determining a relative position of said data on said medium with respect to a benchmark on said magnetic medium, and storing said relative position for later use in verifying said stored data.

2. The method of claim 1 further comprising the step of:

locating a benchmark on said magnetic medium by locating a magnetic fingerprint of said magnetic medium.

3. The method of claim 2 wherein said determining step includes the step of:

measuring the distance between said benchmark and a magnetic feature of said recorded data.

4. The method of claim 3 wherein said storing step includes the step of recording said measured distance as said relative position.

5. The method of claim 1 wherein said storing step includes the step of storing said relative position on said magnetic medium.

6. The method of claim 4 wherein said storing step includes the step of storing said relative position on said magnetic medium.

7. The method of claim 6 wherein the step of measuring includes the step of measuring the distance between said benchmark and a pre-determined bit.

8. The method of claim 7 wherein said bit is a data bit.

9. The method of claim 7 further comprising the step of verifying said data including the steps of measuring the distance between said benchmark and said predetermined bit, and comparing said measured distance with said recorded measured distance.

10. A magnetic medium having verifiable data recorded thereon including a benchmark located on said magnetic medium, data recorded on said magnetic medium, and said data being recorded at a determined relative position with respect to said benchmark.

11. The magnetic medium of claim 10 wherein said benchmark comprises a magnetic fingerprint at any position on said magnetic medium.

12. The magnetic medium of claim 11 wherein said determined relative position is recorded on said magnetic medium.

13. The magnetic medium of claim 11 wherein said determined relative position comprises the distance between said benchmark and a magnetic feature of said recorded data.

14. The magnetic medium of claim 13 wherein said determined relative position is recorded on said magnetic medium.

15. A method for verifying data stored on a magnetic medium, said magnetic medium having a benchmark located thereon, said method comprising the steps of:

measuring the distance between said data and said benchmark, and comparing said measured distance with a pre-recorded measured distance.

16. The method of claim 15 wherein said benchmark comprises a magnetic fingerprint and wherein the step of measuring includes the step of locating said magnetic fingerprint.

17. The method of claim 16 wherein the step of measuring includes the steps of locating a magnetic feature of said data and measuring the distance between said magnetic fingerprint and said magnetic feature.

18. The method of claim 17 further comprising the step of retrieving the magnetic fingerprint from a stored location.

19. The method of claim 18 wherein both of said magnetic fingerprint and said pre-recorded measured distance are stored on said magnetic medium, and further comprising the step of retrieving both of said magnetic fingerprint and said pre-recorded measured distance from storage on said magnetic medium.

20. A method for securely controlling the manipulation of data stored on a magnetic medium, said method comprising the steps of:

verifying the authenticity of data stored on said magnetic medium by comparing the distance between said data and a benchmark on said magnetic medium, with a stored value corresponding to said distance, manipulating said data if said comparison is satisfactory, storing said manipulated data on said magnetic medium, and storing a new measured distance between said manipulated data and said benchmark.

21. The method of claim 20 wherein said benchmark comprises a magnetic fingerprint and wherein said step of comparing includes the step of locating said magnetic fingerprint.

22. The method of claim 21 wherein values corresponding to both of said magnetic fingerprint and said distance are stored on said magnetic medium and wherein the comparison step includes the step of retrieving said values.

* * * * *

UNITED STATES PATENT AND TRADEMARK OFFICE
CERTIFICATE OF CORRECTION

PATENT NO.  : 5,625,689
DATED       : April 29, 1997
INVENTOR(S) : Indeck, et. al.

It is certified that error appears in the above-identified patent and that said Letters Patent is hereby corrected as shown below:

Title page, item [63], Related U.S. Application Data, should read-- Apr. 4, 1994-- and "Ser. No. should read--46,040--.

Column 1, line 9, should read-- Ser. No. 08/046,040--.

Signed and Sealed this

Tenth Day of March, 1998

Attest:

BRUCE LEHMAN

*Attesting Officer*     *Commissioner of Patents and Trademarks*